United States Patent [19]

Nakanose et al.

[11] Patent Number: 4,979,181
[45] Date of Patent: Dec. 18, 1990

[54] VACUUM LASER IRRADIATING APPARATUS

[75] Inventors: Megumi Nakanose, Sagamihara; Naoyuki Koyama, Tokyo; Mitsunori Aoshiba, Sagamihara; Tadao Motegi, Mitaka, all of Japan

[73] Assignee: Nissan Motor Co., Ltd., Yokohama, Japan

[21] Appl. No.: 503,756

[22] Filed: Apr. 3, 1990

[30] Foreign Application Priority Data

| Apr. 28, 1989 | [JP] | Japan | 1-111693 |
| Apr. 28, 1989 | [JP] | Japan | 1-111694 |
| Apr. 28, 1989 | [JP] | Japan | 1-111695 |
| Apr. 28, 1989 | [JP] | Japan | 1-111696 |

[51] Int. Cl.$^5$ .............................................. H01S 3/08
[52] U.S. Cl. ........................................ 372/98; 372/57; 372/65; 372/103; 372/109
[58] Field of Search ............ 372/98, 57, 65, 61, 372/103, 107, 108, 109

Primary Examiner—Leon Scott, Jr.
Attorney, Agent, or Firm—Foley & Lardner, Schwartz, Jeffery, Schwaab, Mack, Blumenthal & Evans

[57] ABSTRACT

In a vacuum laser irradiating apparatus disposed between a laser generator and a vacuum vessel in which an object to be irradiated with a laser beam is placed, an outer window plate is airtightly fixed to the outer opening of the apparatus body to maintain the internal cavity of the apparatus body under a vacuum and to pass the laser beam therethrough. This outer window plate is reinforced so as not to be distorted due to pressure difference between an inside vacuum of the apparatus body and an outside atmospheric pressure. This is because the outer window plate is made of an expensive pure monocrystalline material and therefore it is preferably to reduce the thickness thereof for material cost reduction.

10 Claims, 8 Drawing Sheets

VACUUM LASER IRRADIATING APPARATUS

BACKGROUND OF THE INVENTION

1. Field of the Invention

The present invention relates generally to a vacuum laser irrdiating apparatus disposed between a laser generator and a vacuum vessel in which an object to be tested or processed (cutting, boring, etc.) is placed so as to be irradiated with a laser beam, and more specifically to a vacuum laser irradiating apparatus provided with an outer window plate.

2. Description of the Prior Art

In a certain laser system, an object to be heated or processed is placed within a vacuum vessel and irradiated from outside with a laser beam generated from a laser generator via a vacuum laser irradiating apparatus having a laser transmissible window plate. In the laser system of this type, an excimer laser source such as ArF or XeF is generally utilized. The excimer laser is generated when excited molecules (so-called excimer) produced by atoms under excited conditions and the normal conditions are returned to the dissociation state, and provided with such features as a short wavelength, a high output power, and a high efficiency, etc.

Since the excimer laser is short in wavelength and high in energy, it is impossible to effectively transmit a laser beam through a window plate formed of the ordinary light transmissible material. That is, a window plate formed of a pure monocrystalline material such as calcium fluoride (CaF) or magnesium fluoride (MgF) has been conventionally used to transmit the excimer laser therethrough.

When the above-mentioned monocrystalline material is used as the window plate, however, if the monocrystalline material is mixed with impurity or polycrystalline material, since the laser energy tends to be collected to these impurity or polycrystalline substances, there exists a problem in that the window plate becomes cloudy so that a laser beam cannot be well transmitted. Therefore, it is indispensable to use a pure monocrystalline material including as small amount of impurity or polycrystal substances as possible, so that the cost of the excimer laser transmissible window plate is very high. To reduce the cost thereof, therefore, it has been necessary to reduce the thickness of the window plate as thin as possible.

In some cases, however, since the vacuum vessel is kept at an ultrahigh vacuum less than $10^{-8}$ Torr ($1.33 \times 10^{-6}$ Pa in international system of unit), when a thin window plate formed of expensive CaF or MgF is used, there exists a problem in that the window plate is distorted, damaged or broken at the worst due to a pressure difference between a vacuum inside the vacuum vessel or the irradiating apparatus body and the atmospheric pressure outside the irradiating apparatus. Once the window plate is distorted, since the laser beam is scattered or refracted irregularly, there exists a serious problem in that the excimer laser beam cannot be effectively irradiated upon an objected to be heated or processed.

SUMMARY OF THE INVENTION

With these problems in mind, therefore, it is the primary object of the present invention to provide a vacuum laser irradiating apparatus which can prevent the expensive excimer laser transmissible window plate from being distorted or broken due to a pressure difference between the inside vacuum and the outside atmospheric pressure, while decreasing the cost of the window plate and increasing the life time thereof.

To achieve the above-mentioned object, the vacuum laser irradiating apparatus, according to the present invention, disposed between a laser generator (14) and a vacuum vessel (2) in which an object (7) to be irradiated with a laser beam is placed, said vacuum laser irradiating apparatus comprising: (a) an apparatus body (16) formed with an internal cavity having an inner opening coupled to the vacuum vessel and an outer opening coupled to the laser generator, for guiding a laser beam generated by the laser generator to the object placed within the vacuum vessel; (b) an outer window plate (22) airtightly fixed to the outer opening of said apparatus body to maintain the internal cavity of said apparatus body under vacuum condition, for passing the laser beam therethrough; and (c) means for reinforcing said outer window plate to prevent said outer window plate from being distorted due to pressure difference between an inside vacuum of said apparatus body and an outside atmospheric pressure of said apparatus body.

In the first embodiment of the present invention, the reinforcing means comprises: (a) an inner cylinder device (27) formed with a central laser beam passing hole and disposed inside said apparatus body, for urging said outer window plate from inside; and (b) an outer cylinder device (28) formed with a central laser beam passing hole and disposed outside said apparatus body, for urging said outer window plate from outside in such a way as to sandwich said outer window plate between said inner and outer cylinder devices. In the second embodiment of the present invention, the reinforcing means comprises: (a) an outer laser beam guide member (64) formed with a central laser beam passing hole and disposed outside said apparatus body in contact with said outer window plate; and (b) a vacuum chamber (65) formed between said outer window plate and said outer laser beam guide member, to urge said outer window plate against said outer laser beam guide member when said vacuum chamber is evacuated. In the third embodiment of the present invention, the reinforcing means is a backup member (119) formed with a plurality of parallel-arranged slits (119d) and disposed between a recessed portion of said apparatus body and said outer window plate in contact with an inside surface of said outer window plate.

Further, it is preferable to adjustably moving the outer window plate reinforcing means up and down to change a position through which a laser beam is passed on the outer window plate to increase the life time of the expensive outer window plate. Further, it is preferable to provide an inner thin window plate within the vacuum cavity of the apparatus body to protect the outer window plate from impurity gas generated from an object irradiated with the laser beam.

In general, the window plate for passing an excimer laser beam is made of an expensive pure monocrystalline material such as CaF or MgF and therefore the material cost is very high. Further, since the outer window plate tends to be distorted due to a large pressure difference between an inside vacuum of the apparatus body and the outside atmospheric pressure, the thickness of the outer window plate inevitably increases and therefore the cost thereof is high. In the vacuum laser irradiating apparatus according to the present invention, however, since the outer window plate is reinforced, it is possible to reduce the thickness of the outer window plate and therefore to reduce the cost thereof.

Further, when the position through which a laser beam is passed becomes cloudy after use, since the above-mentioned position can be adjustably changed by moving the reinforcing means formed with a central laser beam passing hole up and down or by selecting another parallel-arranged slit of the backup member, it is possible to use the broad surface of the outer window plate without frequently replacing the outer window plate with a new one, thus reducing the maintenance cost.

Further, when another inner window plate is supported near the inner opening of the apparatus body, it is possible to protect the outer window plate from impurity gas generated from the object irradiated with the laser beam. Since this inner window plate is disposed within a vacuum cavity of the apparatus body, without being subjected to a big pressure difference between both the sides of the inner window plate, the thickness thereof can be reduced and therefore the maintenance cost thereof is not high, even if the inner window plate is frequently replaced with a new one.

DETAILED DESCRIPTION OF THE PREFERRED EMBODIMENTS

Figure 1A:
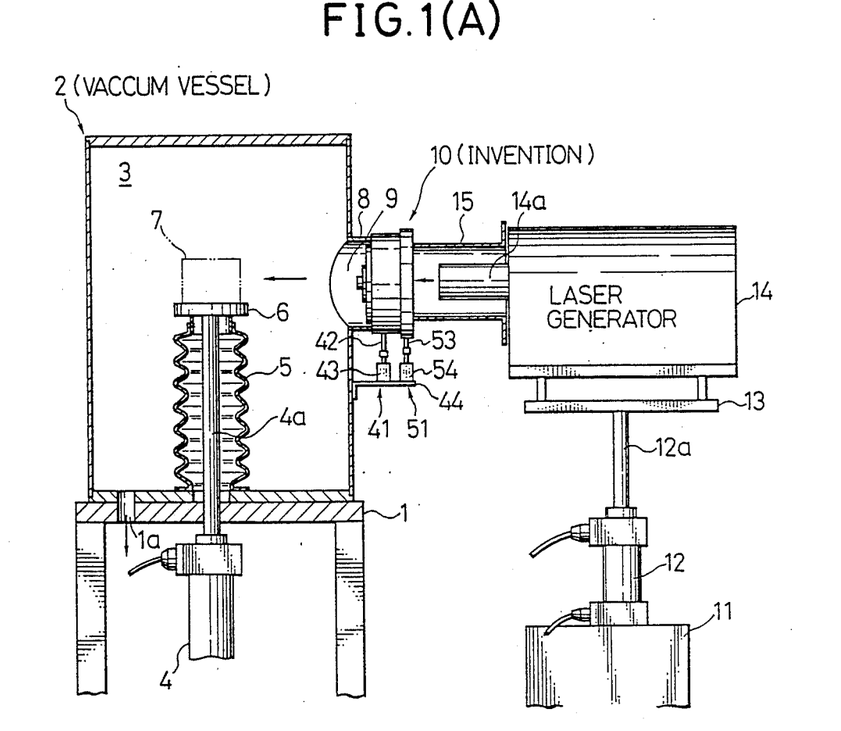
FIG. 1(A) is a diagrammatical view for assistance in explaining a first embodiment of the vacuum laser irradiating apparatus according to the present invention incorporated in an excimer laser system.
Figure 1B:
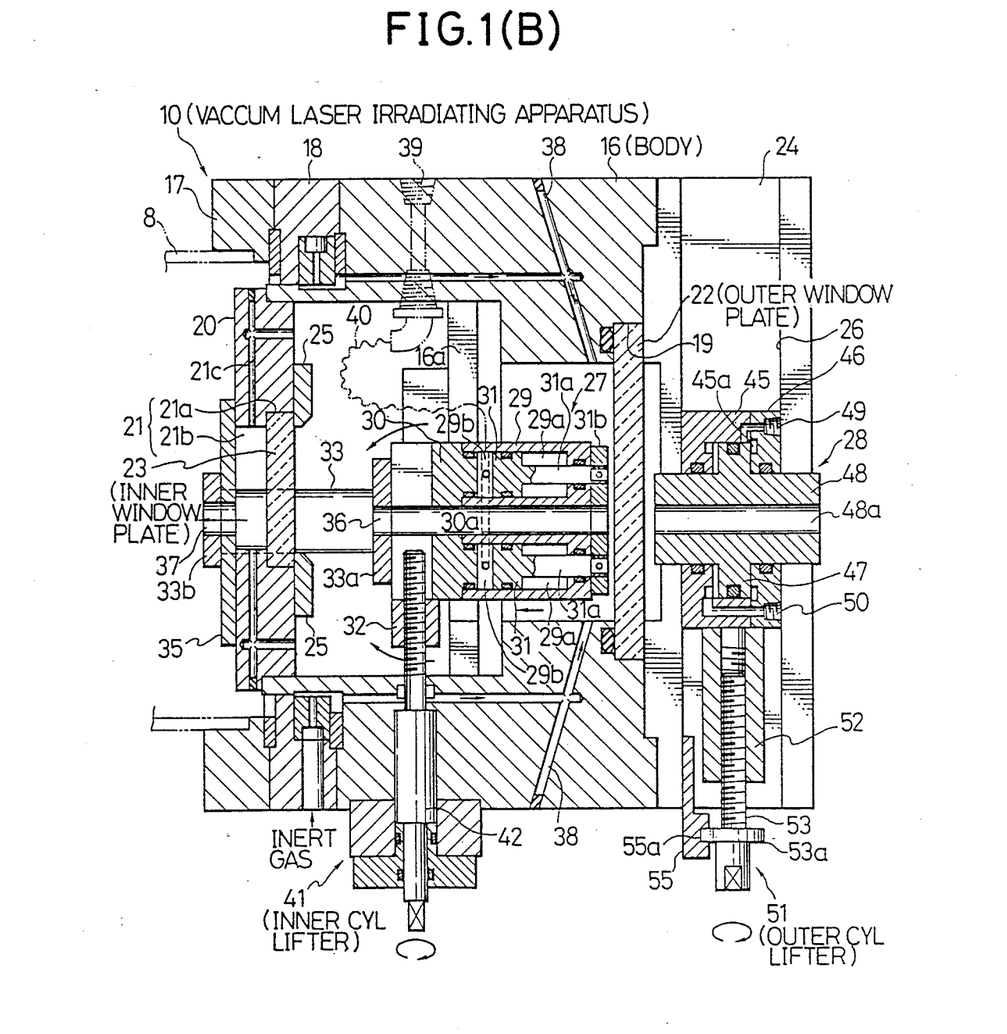
FIG. 1(B) is an enlarged cross-sectional view showing the vacuum laser irradiating apparatus of the first embodiment shown in FIG. 1(A)
Figure 1C:
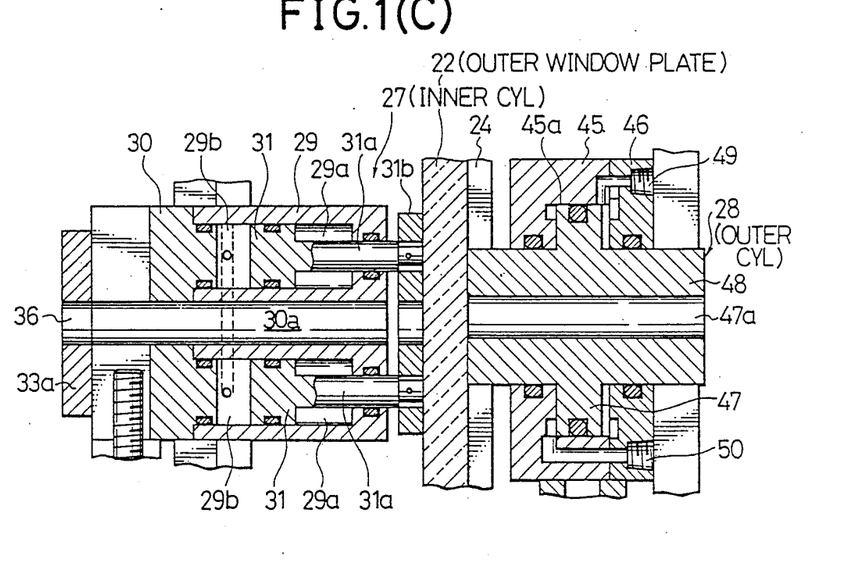
FIG. 1(C) is a further enlarged cross-sectional view showing the essential portion of the first embodiment shown in FIG. 1(B)

With reference to FIGS. 1(A), (B) and (C), a first embodiment of the vacuum laser irradiating apparatus according to the present invention will be described hereinbelow. The feature of this first embodiment is to reinforce an outer window plate 22 by sandwiching it between two hydraulic cylinder devices 27 and 28. In FIG. 1(A), a vacuum vessel 2 is mounted on a support table 1 formed with an evacuation hole 1a. Within a vacuum chamber 3 of the vacuum vessel 2, an object mounting plate 6 movable up and down is supported by a piston rod 4a passed through the support table 1 and a bottom plate of the vacuum vessel 2 and driven by a table lift cylinder 4. The piston rod 4a is covered by a bellow 5, and an object 7 to be heated or processed (cutting, boring, etc.) is mounted on the object mounting plate 6.

The vacuum vessel 2 is formed with a side cylindrical portion 8 so as to provide an aperture 9 open toward the vacuum vessel 2. A vacuum laser irradiating device 10 is attached to this aperture 9 of the vacuum vessel 2.

On the other hand, a laser generator 14 movable up and down is supported by another piston rod 12a driven by another generator lift cylinder 12 supported on a support base 11. Further, a laser guide cylinder 15 is attached to one side of the laser generator 14, and a laser emitting cylindrical portion 14a is inserted into this laser guide cylinder 15.

Further, as described in further detail with reference to FIG. 1(B), two pulse motors 43 and 54 are mounted on a motor support plate 44 in order to rotate two feed screws 42 and 53 so that two inner and outer window plate pushing hydraulic cylinders 27 and 28 (shown in FIGS. 1(B) and (C)) are adjustably moved up and down.

Therefore, in the vacuum laser irradiating apparatus shown in FIG. 1(A), an excimer laser generated by the laser generator 14 is transmitted to an object 7 through the vacuum laser irradiating apparatus 10 according to the present invention.

With reference to FIG. 1(B), the vacuum laser irradiating apparatus 10 will be described in further detail hereinbelow. The apparatus 10 comprises roughly a cylindrical apparatus body 16 formed with an internal cavity, an outer window plate 22, an inner window plate 23, an outer hydraulic cylinder device 28 formed with a central laser beam passing hole 48a, an inner hydraulic cylinder device 27 formed with a central laser beam passing hole 30a, an inner window plate mounting plate 20, an annular intermediate member 18, an annular apparatus mounting member 17, etc.

The apparatus mounting member 17 is fixed to the side cylindrical portion 8 of the vacuum vessel 2, and the cylindrical apparatus body 16 is fixed to the apparatus mounting member 17 with bolts via the annular intermediate member 18 sandwiched between the apparatus mounting member 17 and the apparatus body 16. The inner window plate mounting plate 20 is fitted to the left (inner) side of the cylindrical apparatus body 16. The outer window plate 22 is fitted to an outer window plate fitting hole 19 formed in the apparatus body 16, and the inner window plate 23 is fixed to a large-diameter portion 21a of a laser passing hole 21 formed in the inner window plate mounting plate 20. This laser passing hole 21 is further formed with a small-diameter portion 21b opening into the vacuum chamber 3 and communicating with inert gas passages 21c formed in the inner window plate mounting plate 20.

The outer circumference of the outer window plate 22 is pushed into the outer window plate mounting hole 19 by a guide member 24 removably fixed to the right end surface of the apparatus body 16 with bolts. In the same way, the outer circumference of the inner window plate 23 is pushed into the inner window plate mounting hole 21a by a mounting plate 25 with bolts. These two inner and outer window plates 23 and 22 are formed of a pure monocrystalline material such as CaF or MgF which can transmit an excimer laser beam therethrough.

The cylindrical apparatus body 16 is formed with a vertical guide groove 16a along which an inner hydraulic cylinder device 27 for pushing the outer window plate 22 from inside is slidably movable up and down. The guide member 24 is formed with a vertical guide groove 26 along which an outer hydraulic cylinder device 28 for pushing the outer window plate 22 from outside is slidably movable up and down.

As better shown in FIG. 1(C), the inner hydraulic cylinder device 27 comprises a cylinder body 29 formed with two cylinders 29a, a cylinder lid 30 having a central hole 30a, two pistons 31 slidably disposed within the cylinders 29a respectively, two piston rods 31a fixed to the pistons 31 respectively, and an outer window plate push plate 31b fixed to two ends of the two piston rods 31a, separately and formed with a central laser beam passing hole. Further, two hydraulic chambers 29b are formed between the cylinder lid 30 and the two pistons 31, respectively, into which a hydraulic pressure is applied from an oil pump (not shown) via an oil passage 39 formed in the cylindrical apparatus body 16 and a flexible hose 40 both shown in FIG. 1(B).

Further, although not shown, the inner hydraulic cylinder device 27 is formed with a projected guide portion (not shown) engaged with a guide groove 16a formed in the cylindrical apparatus body 16 so as to be movable up and down along the guide groove 16a. Further, a nut 32 is formed at the lower portion of the cylinder lid 30. The cylinder lid 30 and an inner lid 35 are connected by two connecting arms 33 (only one is shown in FIG. 1(B)) by fixing an outer base portion 33a having a central hole 36 to the cylinder lid 30 and an inner base portion 33b having a central hole 37 to the inner lid 35. These two connecting arms 33 are slidably moved up and down along two slits (not shown) formed vertically in the inner wall surfaces of the apparatus body 16. The inner hydraulic cylinder device 27 is moved up and down by an inner cylinder lifter 41 made up of a feed screw 42 formed with a screw portion engaged with the nut portion 32 of the cylinder lid 30, and the pulse motor 43 mounted on the motor support plate 44 as shown in FIG. 1(A).

The outer hydraulic cylinder device 28 includes a cylinder body 45, an annular lid 46 for closing a cylinder chamber 45a of the cylinder body 45, a piston 47 disposed within the cylinder chamber 45a, and a piston rod 48 formed integral with the piston 47 and disposed passing through the cylinder body 45 and the annular lid 46. A laser guide hole 48a is formed at the center of the piston rod 48. Further, two oil passages 49 and 50 are formed on both the upper and lower sides of the cylinder chamber 45a respectively so as to pass through the cylinder body 45 and the annular lid 46. An oil pump (not shown) is connected to these two oil passages 49 and 50 via a switching valve (not shown) to actuate the outer hydraulic cylinder device 28. This outer cylinder device 28 is moved up and down by an outer cylinder lifter 51 made up of a feed screw 53 formed with a screw portion engaged with a nut portion 52 fixed to the lower end of the cylinder body 45 of the outer cylinder body 45, and a pulse motor 54 mounted on the motor support plate 44 as shown in FIG. 1(A). Further, the feed screw 53 is formed with a flange 53a engaged with a groove 55a of a support member 55 fixed to the guide member 24.

Therefore, a laser beam generated by the laser generator 14 is transmitted to an object 7 disposed within the vacuum vessel 3 via the laser guide hole 48a of the piston rod 48 of the outer cylinder device 28, the outer window plate 22, a central hole of the push plate 31b, the central hole of the cylinder body 29, the central hole 30a of the cylinder lid 30, the central hole 36 of the outer base portion 33a, the inner window plate 23, a central hole of the inner lid 35, and a central hole 37 of the inner base portion 33b of the connecting arm 33.

Further, two inert gas passages 38 are formed in the cylindrical apparatus body 16 to feed an inert gas, through the internal cavity of the cylindrical apparatus body 16, into the vacuum vessel 2.

The operation and the function of the vacuum laser irradiating apparatus of the first embodiment according to the present invention will be explained hereinbelow.

Prior to the evacuation of the vacuum vessel 2, a hydraulic fluid is supplied to one end of the cylinder chamber 45a of the outer hydraulic cylinder device 28 via the oil passage 49, in order to urge the piston rod 48 against the outer window plate 22 from outside. In addition, another hydraulic fluid is supplied to the hydraulic chamber 29b of the inner hydraulic cylinder device 27 via the oil passage 39 and the oil hose 40, in order to urge the push plate 31b against the same outer window plate 22 from inside. As a result, the outer window plate 22 is sandwiched between the push plate 31b and the piston rod 48, as depicted in FIG. 1(C). Therefore, it is possible to reinforce the rigidity of a relatively thin outer window plate 22 made of an expensive pure monocrystalline material such as CaF or MgF.

Thereafter, the vacuum vessel 2 is evacuated into a vacuum through the evacuation hole 1a; the table lift cylinder 4 is actuated to position an object 7 mounted on the object mounting plate 6 within the vacuum vessel 2 so as to be aligned with the laser beam passage of the vacuum laser irradiating apparatus 10. In the same way, the generator lift cylinder 12 is actuated to match the height position of the laser beam generated from the laser generator 14 with the laser beam passage of the apparatus 10. Under these conditions, the laser beam passing holes 48a, 30a, 36, 37 etc. are all aligned with a line connected between the object 7 and the center of the laser emitting cylinder portion 14a (shown in FIG. 1A) in order that the object 7 is irradiated with a laser beam generated from the laser generator 14 and passed through the two outer and inner window plates 22 and 23 and the laser beam passing holes.

Further, an inert gas is supplied into the inner cavity of the cylindrical apparatus body 16 via the passages 38. The supplied inert gas is further introduced into the vacuum vessel 2 via the gas passages 21c formed in the inner window plate mounting plate 20, the small-diameter portion 21b thereof, and the central hole 37 of the inner base portion 33b of the connecting arm 33. This inert gas serves to prevent organic substances produced from the object 7 from being scattered and stuck onto the inner and outer window plates 23 and 22.

Herein, in particular, since the impurity gas produced from the object 7 is mainly stuck onto the inner window plate 23, it is possible to protect the outer window plate 22 from impurity substances. In other words, it is possible to reduce the maintenance cost. The reason is as follows: In the case of the outer window plate 22, since a pressure difference between both the surfaces thereof (vacuum and atmospheric pressure) is large, it is necessary to increase the thickness of the outer window plate 22 made of an expensive material. Therefore, it is not economical to often replace the outer window plate 22 with a new one. However, since the inner window plate 23 is disposed within a vacuum, the thickness thereof can be reduced and therefore the cost thereof is not high, so that the inner window plate 23 can be replaced with a new one at relatively low cost.

Further, when an area on the outer window plate 22 through which the laser beam is passed has become cloudy after a predetermined time has elapsed, the push plate 31b and the piston rod 48 are both moved away from both the surfaces of the outer window plate 22 as depicted in FIG. 1(B), and then the two pulse motors 43 and 54 shown in FIG. 1(A) are driven in synchronism with each other to rotate the feed screws 42 and 53, so that the inner and outer hydraulic cylinder devices 27 and 28 can be moved up and down to change the laser beam passing position on the outer window plate 22.

Figure 2A:
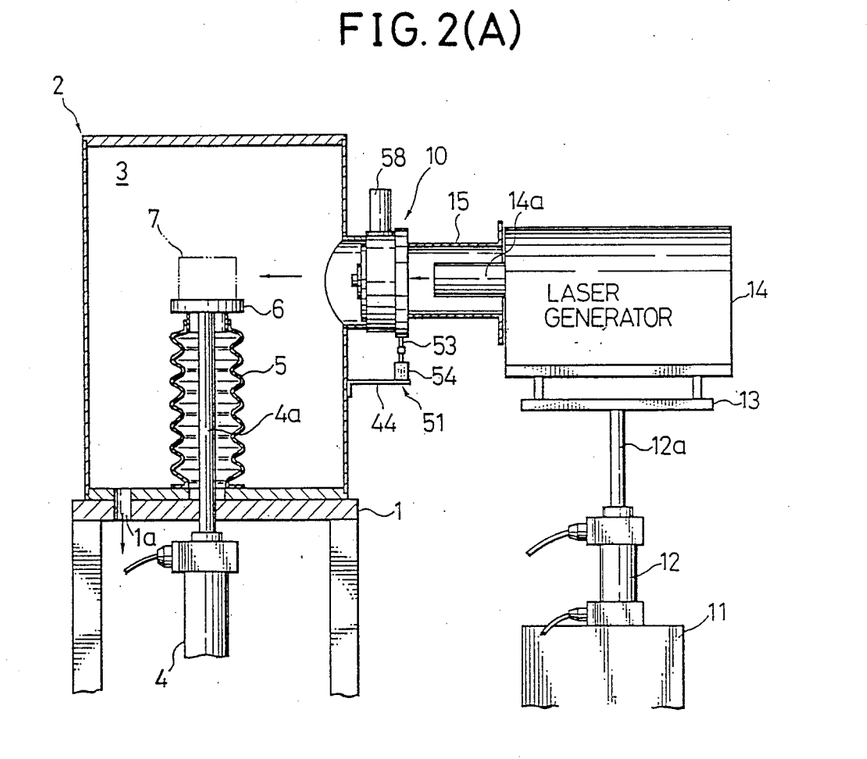
FIG. 2(A) is a diagrammatical view for assistance in explaining a second embodiment of the vacuum laser irradiating apparatus according to the present invention incorporated in an excimer laser system.
Figure 2B:
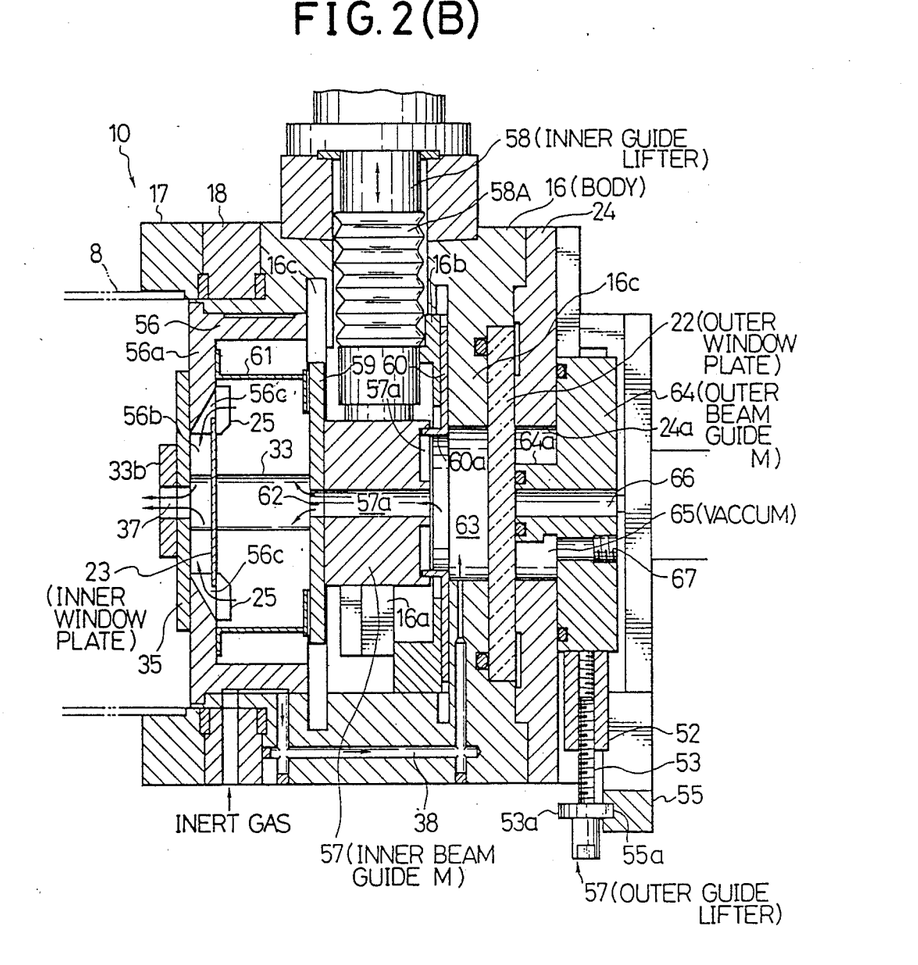
FIG. 2(B) is an enlarged cross-sectional view showing the vacuum laser irradiating apparatus of the second embodiment shown in FIG. 2(A)

With reference to FIGS. 2(A) and 2(B), a second embodiment of the present invention will be described hereinbelow. The feature of this second embodiment is to reinforce the outer window plate 22 by urging it against an outer beam guide member 64 by means of a vacuum.

In comparison of FIG. 2(A) with FIG. 1(A), the difference between the two is to provide an inner guide lifter 58 in place of the inner cylinder lifter 41.

In FIG. 2(B), an inner cylindrical body 56 is fixed to an inner end of the apparatus body 16. This inner cylindrical body 56 is formed with a central hole 56b in an end wall 56a thereof. An inner window plate 23 is disposed on the outside of the end wall 56a so as to cover the central hole 56b from outside with an annular chamfered space 56c formed between the end wall 56a and the inner window plate 23. The inner window plate 23 is fixed between the end wall 56a and support members 25 with bolts (not shown).

An inner laser beam guide member 57 formed with a central hole 57a is disposed within an inner cavity of the apparatus body 16 in such a way that a projecting portion (not shown) formed on the side surface of the guide member 57 is slidably engageable with a vertically extending guide groove 16a formed in the apparatus body 16. Therefore, the laser beam guide member 57 is moved up and down by an inner guide (e.g. hydraulic) lifter 58 having a bellow 58A within which a lifting member connected to the guide member 57 is housed. An outer mask plate 59 having a central hole 62a is fixed to the inner end of the guide member 57 and moved up and down along a groove 16c formed in the apparatus body 16.

An annular recess 57a is formed on the outer end of the guide member 57. An arcuate support member 16b is fixed to the cylindrical apparatus body 16 so that an outer mask plate 60 is movable along a space formed between the arcuate support member 16b and a wall 16c of the apparatus body 16. The outer mask plate 60 is formed with a short axially extending cylindrical portion 60a which is fitted to the annular recess 57a formed in the guide member 57. In the same way as in the first embodiment, the inner laser beam guide member 57 and the inner lid 35 are connected by two connecting arms 33 (only one is shown in FIG. 2(B)) by fixing the outer mask plate 59 to the inner beam guide member 57 and the outer base portion 33b to the inner lid 35. These two connecting arms 33 are slidably moved up and down along two slits (not shown) formed vertically in the inner surface of the end wall 56a of the inner cylindrical body 56. Further, another cylindrical body 61 is disposed between the end wall 56a and the outer mask plate 59 to airtightly guide the outer mask plate 59 in the vertical direction. Therefore, when the inner beam guide lifter 58 is actuated, the laser beam guide member 57, the outer mask plate 59, the inner lid 35 and the two connecting arms 33 are all moved up and down together.

Further, the outer window plate 22 is sandwiched between the end wall 16c of the apparatus body 16 and a plate guide member 24. An outer laser beam guide member 64 formed with a central hole 66 is supported between the plate guide member 24 and the support member 55 so as to be movable up and down by the outer guide lifter 57 in the same way as in the first embodiment. The outer laser beam guide member 64 is formed with an axially extending cylindrical projection 64a so as to be brought into contact with the outer surface of the outer window plate 22. A vacuum chamber 65 is formed around the cylindrical projection 64a so as to communicate with a vacuum pump (not shown) via a vacuum passage 67 formed in the outer beam guide member 64. Therefore, when the vacuum chamber 65 is evacuated, the outer window plate 22 is urged against the cylindrical projection 64a of the outer laser beam guide member 64. Further, a laser beam generated by the laser generator 14 is passed through a central hole 66 of the outer laser beam guide member 64, the inner window plate 22, a central hole 57a of the inner laser beam guide member 57, the central hole 62 of the outer mask plate 59, and a central hole 37 of the inner base portion 33b and the inner lid 35. An inert gas is introduced into the internal cavity 63 of the apparatus body via a gas passage 38.

The structural features and functional effects of this second embodiment other than those described above are substantially the same as with the first embodiment previously described, and therefore the same references have been retained for similar parts, without repeating the description thereof.

The operation of the second embodiment will be described hereinbelow. The vacuum vessel 2 is evacuated by a vacuum pump (not shown) via the evacuation hole 1a, and further the vacuum chamber 65 is evacuated to reinforce the outer window plate 22 by urging it against the cylindrical projection 64a of the outer laser beam guide member 64.

Thereafter, the lift cylinder 4 (shown in FIG. 2A) is actuated to position an object 7 mounted on the object mounting plate 6 within the vacuum vessel 2 so as to be aligned with the laser beam passage of the vacuum laser irradiating apparatus 10. In the same way, the generator lift cylinder 12 is also actuated to match the height position of the laser beam generated from the laser generator 14 with the laser beam passage of the apparatus 10. Under these conditions, the laser beam passing holes 66, 57a, 62, 37, etc. are all aligned with a line connected between the object 7 and the center of the laser emitting cylinder portion 14a in order that the object 7 is irradiated with a laser beam generated from the laser generator 14 and passed through the two outer and inner window plates 22 and 23 and the laser beam passing holes.

Further, an inert gas is supplied into the inner cavity of the cylindrical apparatus body 16 via the passage 38. The supplied inert gas is further introduced into the vacuum vessel 2 via the annular chamfered space 56c formed between the end wall 56a and the inner window plate 23, the central hole 56b of the inner cylindrical body 56, and the central hole 37 of the inner base portion 33b of the connecting arm 33.

Further, when a position on the outer window plate 22 through which the laser beam is passed has become cloudy after use, a vacuum within the vacuum chamber 63 is released, and then the outer guide lifter 57 and the inner guide lifter 58 are both actuated in synchronism with each other, so that the inner laser beam guide member 57 and the outer laser beam guide member 64 can be moved up and down to change the laser beam passing position on the outer window plate 22.

Figure 3A:
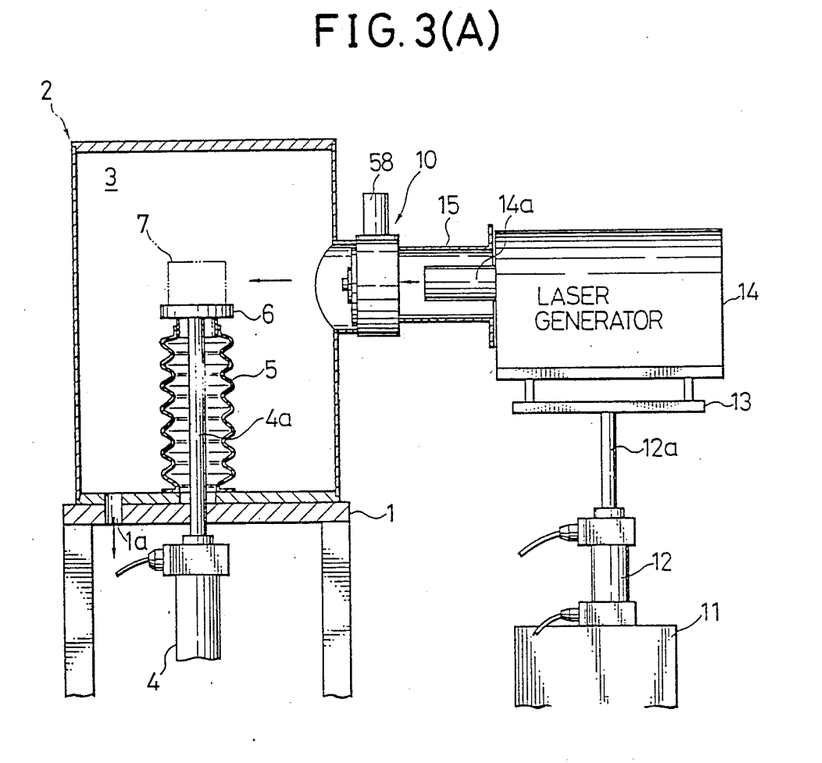
FIG. 3(A) is a diagrammatical view for assistance in explaining a third embodiment of the vacuum laser irradiating apparatus according to the present invention incorporated in an excimer laser system.

With reference to FIGS. 3(A), (B), (C) and (D), a third embodiment of the present invention will be described hereinbelow. The feature of this third embodiment is to reinforce the outer window plate 22 by means of a backup member 119 formed with parallel arranged slits 119d.

In comparison of FIG. 3(A) with FIG. 1(A), the difference between the two is to provide only the inner guide lifter 58 without use of other lifters 41 and 51.

Figure 3B:
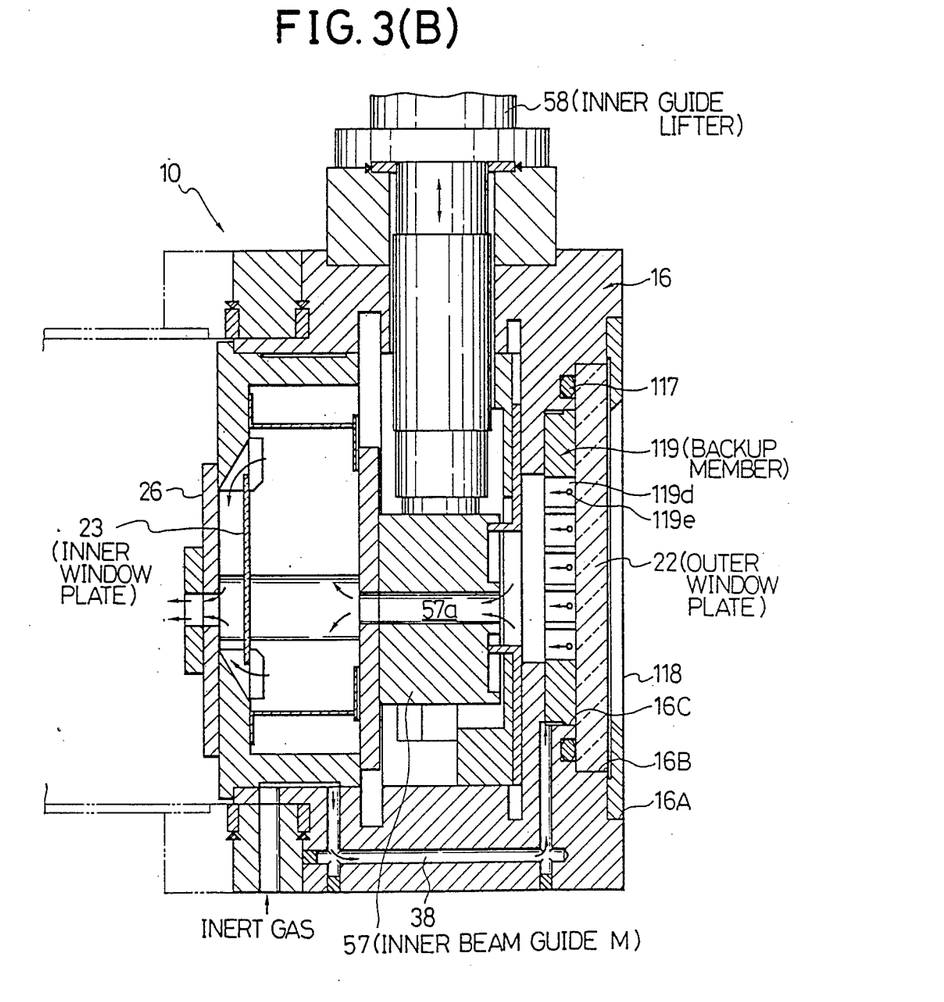
FIG. 3(B) is an enlarged cross-sectional view showing the vacuum laser irradiating apparatus of the third embodiment shown in FIG. 3(A)

In FIG. 3(B), the cylindrical apparatus body 16 is formed with three annular stepped recesses of a first large-diameter circular stepped recess 16A, a second medium-diameter circular stepped recess 16B, and a third small-diameter circular stepped recess 16c. A circular backup member 119 is fitted to the third circular stepped recess 16c; a circular outer window plate 22 is fitted to the second circular stepped recess 16B via a sealing ring member 117; and an annular push member 118 is fitted to the first circular stepped recess 16A to reinforce the outer window plate 22 by sandwiching the outer window plate 22 between the backup member 119 and the push member 118.

Figure 3C:
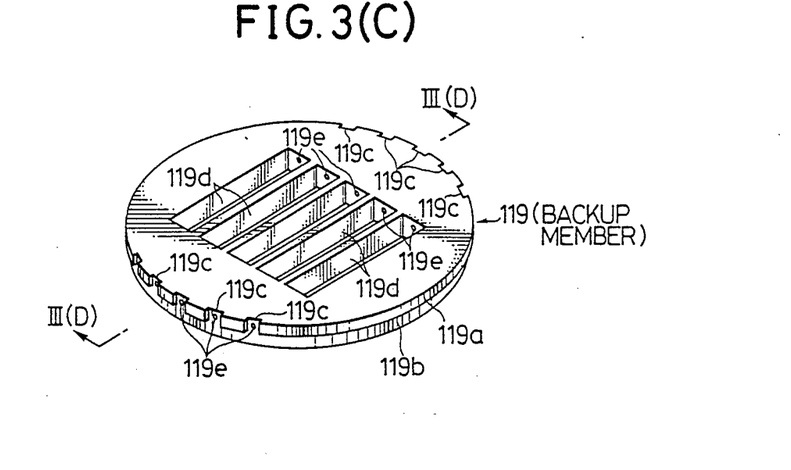
FIG. 3(C) is a perspective view showing a backup member attached to the vacuum laser irradiating apparatus of the third embodiment shown in FIG. 3(B)
Figure 3D:
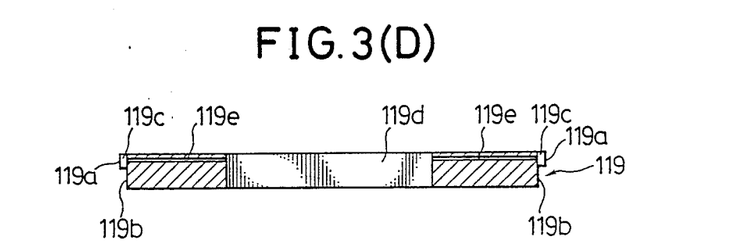
FIG. 3(D) is a cross-sectional view taken along the line III(D)—III(D) shown in FIG. 3(C).

As shown in FIGS. 3(C) and (D), the backup member 119 is made of a beam shading material and formed with a large-diameter circumferential surface portion 119a and a small-diameter circumferential surface portion 119b. A plurality of parallel-arranged rectangular slits 119d (e.g. five slits in FIG. 3(C) are formed in the backup member 119 to pass a laser beam therethrough. On both sides of each of the slits 119d, a pair of axially extending grooves 119c are formed on the large-diameter circumferential surface portion 119a. Further, each rectangular slit 119d communicates with the two opposing axially extending grooves 119c via two opposing communication holes 119e, as depicted in FIG. 3(D).

An inert gas is supplied from a pump (not shown) into an inner cavity of the vacuum laser irradiating apparatus 10 via a gas passage 38, the small-diameter circumferential surface 119b of the backup member 119, the grooves 119c, the communication holes 119e, the rectangular slits 119d, etc. in the direction opposite to that impurity gas is emitted from the object 7 to the outer window plate 22.

Further, in this third embodiment, the central hole 57a of the laser beam guide member 57 is adjustably moved up and down by the inner guide lifter 58 so that the central hole 57a matches one of the parallel-arranged rectangular slits 119d of the backup member 119, after part of the outer window plate 22 has been damaged into a cloudy state. In this case, the object mounting plate 6 and the laser generator 14 are both also adjustably moved up and down so that a laser beam can be transmitted from the laser beam generator 14 to the object 7 through the laser beam passing holes 65 formed in the vacuum laser irradiating apparatus 10.

In this third embodiment, the outer window plate 22 and the backup member 119 are fixed and only the inner laser beam guide member 57 is adjustably moved up and down. Without being limited thereto, however, it is also possible to adjustably move the outer window plate 22 and the backup member 119 simultaneously without moving the inner laser beam guide member 57. In this case, it is unnecessary to adjustably move the object mounting plate 6 and the laser generator 14.

As described above, in the vacuum laser irradiating apparatus according to the present invention, since the outer window plate 22 made of an expensive pure monocrystalline material can be reinforced by sandwiching the plate between the two hydraulic cylinder devices 27 and 28, by urging the plate against the outer laser beam guide member 64 by a vacuum from inside or by attaching the backup member 119 to the plate from inside, it is possible to reduce the thickness of the outer window plate and therefore reduce the cost thereof, without increasing distortion of the outer window plate or damaging the outer window plate due to a large difference in pressure between a vacuum within the apparatus and the outside atmospheric pressure.

Further, since the position or area through which a laser beam is passed is adjustably moved up and down on the surface of the outer window plate by use of the lifter or the filters, it is possible to effectively utilize the broad surface of the outer window plate. Therefore, it is possible to use the expensive outer window plate for many hours, without often replacing the outer window plate with a new one, thus reducing the maintenance cost.

Further, since a thin (low costly) inner window plate 23 is disposed in the vacuum cavity within the apparatus so that impurity gas is easily stuck onto the inner window plate, it is possible to protect the thick (high costly) outer window plate from impurity gas generated from an object irradiated with a laser beam.

What is claimed is:

1. A vacuum laser irradiating apparatus disposed between a laser generator and a vacuum vessel in which an object to be irradiated with a laser beam is placed, said vacuum laser irradiating apparatus comprising:
   (a) an apparatus body formed with an internal cavity having an inner opening coupled to the vacuum vessel and an outer opening coupled to the laser generator, for guiding a laser beam generated by the laser generator to the object placed within the vacuum vessel;
   (b) an outer window plate airtightly fixed to the outer opening of said apparatus body to maintain the internal cavity of said apparatus body under vacuum condition, for passing the laser beam therethrough; and
   (c) means for reinforcing said outer window plate to prevent said outer window plate from being distorted due to pressure difference between an inside vacuum of said apparatus body and an outside atmospheric pressure of said apparatus body.

2. The vacuum laser irradiating apparatus of claim 1, wherein said reinforcing means comprises:
   (a) an inner cylinder device formed with a central laser beam passing hole and disposed inside said apparatus body, for urging said outer window plate from inside; and
   (b) an outer cylinder device formed with a central laser beam passing hole and disposed outside said apparatus body, for urging said outer window plate from outside in such a way as to sandwich said outer window plate between said inner and outer cylinder devices.

3. The vacuum laser irradiating apparatus of claim 2, which further comprises:
   (a) an inner cylinder lifter for adjustably moving said inner cylinder device up and down;
   (b) an outer cylinder lifter for adjustably moving said outer cylinder device up and down, to change a position through which a laser beam is passed on said outer window plate in cooperation with said inner cylinder lifter.

4. The vacuum laser irradiating apparatus of claim 1, wherein said reinforcing means comprises:
   (a) an outer laser beam guide member formed with a central laser beam passing hole and disposed outside said apparatus body in contact with said outer window plate; and
   (b) a vacuum chamber formed between said outer window plate and said outer laser beam guide member, to urge said outer window plate against said outer laser beam guide member when said vacuum chamber is evacuated.

5. The vacuum laser irradiating apparatus of claim 4, which further comprises an outer guide lifter for adjustably moving said outer laser beam guide member up and down to change a position through which a laser beam is passed on said outer window plate.

6. The vacuum laser irradiating apparatus of claim 1, wherein said reinforcing means is a backup member formed with a plurality of parallel-arranged slits and disposed between a recessed portion of said apparatus body and said outer window plate in contact with an inside surface of said outer window plate.

7. The vacuum laser irradiating apparatus of claim 4, which further comprises:
   (a) an inner laser beam guide member formed with a central laser beam passing hole and disposed inside said apparatus body; and
   (b) an inner guide member lifter for adjustably moving said inner laser beam guide member up and down to select one of said parallel-arranged slits of said backup member to change a position through which a laser beam is passed on said outer window plate.

8. The vacuum laser irradiating apparatus of claim 6, wherein said apparatus body is formed with at least one inert gas passage and said backup member is formed with a plurality of axially extending grooves formed in an outer circumferential surface of said backup member and with a plurality of inert gas holes communicating between said parallel-arranged slits and said grooves, in such a way that an inert gas is introduced into the vacuum vessel via said at least one inert gas passage, said grooves, said inert gas holes, and said slits to protect the inner and outer window plate from impurity gas generated from the object irradiated with the laser beam.

9. The vacuum laser irradiating apparatus of claim 1, which further comprises an inner window plate supported near the inner opening of said apparatus body with a space between said inner window plate and said apparatus body or a passage formed in said apparatus body to protect said outer window plate from impurity gas generated from the object irradiated with the laser beam.

10. The vacuum laser irradiating apparatus of claim 1, wherein said apparatus body is formed with at least one inert gas passage for introducing inert gas from the outer window plate side into the vacuum vessel, to protect the inner and outer window plate from impurity gas generated from the object irradiated with the laser beam.

* * * * *